United States Patent
Tsuda

(10) Patent No.: US 12,326,221 B2
(45) Date of Patent: Jun. 10, 2025

(54) ENTRY DETECTION SYSTEM

(71) Applicant: Daifuku Co., Ltd., Osaka (JP)

(72) Inventor: Yasuhiro Tsuda, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 403 days.

(21) Appl. No.: 18/009,565

(22) PCT Filed: Apr. 23, 2021

(86) PCT No.: PCT/JP2021/016445
§ 371 (c)(1),
(2) Date: Dec. 9, 2022

(87) PCT Pub. No.: WO2021/251012
PCT Pub. Date: Dec. 16, 2021

(65) Prior Publication Data
US 2023/0204157 A1      Jun. 29, 2023

(30) Foreign Application Priority Data

Jun. 12, 2020   (JP) ................................ 2020-102444

(51) Int. Cl.
*F16P 3/14*   (2006.01)

(52) U.S. Cl.
CPC .............. *F16P 3/141* (2013.01); *F16P 3/144* (2013.01)

(58) Field of Classification Search
CPC .................................. F16P 3/141; F16P 3/144
See application file for complete search history.

(56) References Cited

U.S. PATENT DOCUMENTS

| | | | |
|---|---|---|---|
| 7,990,269 B2 * | 8/2011 | Bork ....................... | G01V 8/20 340/556 |
| 2003/0146373 A1 * | 8/2003 | Kudo ....................... | G01V 8/20 250/221 |
| 2009/0058642 A1 * | 3/2009 | Fukumura ................ | G01V 8/20 340/556 |
| 2014/0002264 A1 * | 1/2014 | Kikuchi ............... | G08B 13/183 340/556 |
| 2016/0097878 A1 * | 4/2016 | Kikuchi .................. | F16P 3/144 250/221 |
| 2017/0052278 A1 * | 2/2017 | Stein ........................ | G01V 8/20 |

FOREIGN PATENT DOCUMENTS

JP          2010133503 A        6/2010

* cited by examiner

*Primary Examiner* — Scott Bauer
(74) *Attorney, Agent, or Firm* — The Webb Law Firm

(57) ABSTRACT

In an entry detection system, detection of an object that is allowed to enter the region is appropriately disabled. An entry detection system for detecting an object entering a region includes: an entry detection sensor configured to detect whether or not a part of the object is present within an entry detection plane; a muting sensor section including a first unit and a second unit; and a control unit. The control unit disables the entry detection sensor in response to at least one of a first detection state and a second detection state being established, the first detection state is a state in which the first unit provided on a passing direction-first side of the entry detection plane detects the object, and the second detection state is a state in which the second unit provided on a passing direction-second side of the entry detection plane detects the object.

11 Claims, 4 Drawing Sheets

ENTRY DETECTION SYSTEM

CROSS-REFERENCE TO RELATED APPLICATIONS

This application is the United States national phase of International Application No. PCT/JP2021/016445 filed Apr. 23, 2021, and claims priority to Japanese Patent Application No. 2020-102444 filed Jun. 12, 2020, the disclosures of which are hereby incorporated by reference in their entireties.

BACKGROUND OF THE INVENTION

Field of the Invention

The present invention relates to an entry detection system for detecting an object entering a predefined region.

Description of Related Art

JP 2010-133503A (Patent Document 1) discloses a safety system including a so-called light curtain (30) at a loading port for loading an article (31) into a specific region, wherein the safety system detects a worker or the like entering the specific region from the loading port (the reference numerals in the parentheses in the Background Art section are those used in the referred reference). The light curtain (30) also detects an article (31) to be loaded, and is therefore provided with the function (muting function) for disabling detection by the light curtain (30) when the article (31) is loaded. Specifically, two sets of retroreflective photoelectric sensors are installed as muting sensors whose detection ranges intersect in the vicinity of a detection plane of the light curtain (30) in a plan view, and detection by the light curtain (30) is disabled in response to an article (31) to be loaded being detected in front of the loading port extending along a loading path.

Patent Document

Patent Document 1: JP 2010-133503A

In the above-described configuration, the detection ranges of the two sets of retroreflective photoelectric sensors intersect, and it is therefore not possible to secure a large distance from the detection plane of the light curtain to the position at which the object is detected, unless the intersecting angle of the detection ranges is increased. However, increasing the intersecting angle requires a large installation space in order for the two sets of retroreflective photoelectric sensors to be placed away from the light curtain. When the installation space is limited, it is not possible to secure a distance between the detection position of each of the muting sensors and the detection position of the light curtain, and the light curtain may not be appropriately disabled depending on the shape of the object.

SUMMARY OF THE INVENTION

In view of the foregoing circumstances, there is a need to provide a technique by which, in an entry detection system for detecting an object entering a predefined region, it is possible to appropriately disable detection of an object that is allowed to enter the region.

In view of the foregoing, an entry detection system for detecting an object entering a predetermined region includes: an entry detection sensor configured to detect whether or not a part of the object is present in an entry detection plane having a predetermined area; a muting sensor section configured to detect the object in order to disable detection of the object by the entry detection sensor, the muting sensor section including a first unit and a second unit; and a control unit configured to control operation of the entry detection sensor, based on a detection result of the muting sensor section, wherein with a passing direction being a direction orthogonal to the entry detection plane, a passing direction-first side being one side in the passing direction, and a passing direction-second side being another side in the passing direction, the first unit includes a pair of first sensors disposed on the passing direction-first side of the entry detection plane in such a manner as to be spaced apart and opposed in a width direction extending parallel to the entry detection plane, each of the two first sensors detects whether or not the object is present within a predefined first detection range, the first detection range extends from each of the two first sensors toward each other in the width direction, and a pair of the first detection ranges are set in such a manner as to be spaced apart from each other in the width direction, the second unit includes a pair of second sensors disposed on the passing direction-second side of the entry detection plane in such a manner as to be spaced apart and opposed in the width direction, each of the two second sensors detects whether or not the object is present within a predefined second detection range, the second detection range extends from each of the second sensors toward each other in the width direction, and a pair of the second detection ranges are set in such a manner as to be spaced apart from each other in the width direction, and the control unit disables the entry detection sensor in response to at least one of a first detection state and a second detection state being established, the first detection state being a state in which both of the two first sensors detect the object, and the second detection state being a state in which both of the two second sensors detect the object.

With this configuration, the components of the muting sensor section capable of detecting an object are installed on both the passing direction-first side and the passing direction-second side of the entry detection plane. Accordingly, an object approaching the entry detection plane in the passing direction can be detected by the components of the muting sensor section that are located on one side out of the passing direction-first side and the passing direction-second side, before the object reaches the entry detection plane. If a part of the object is still present in the entry detection plane after the whole of the object has passed through the detection range of the components of the muting sensor section that are located on the one side, the object can be detected by the components of the muting sensor section that are located on the other side. Accordingly, if the detected object is an object that is allowed to pass through the entry detection plane, it is possible to promptly disable the entry detection sensor before the object reaches the entry detection plane, and appropriately continue the disabling while the object moves past the entry detection plane. With the present configuration, the first sensors, which are components of the muting sensor section, are disposed on the passing direction-first side of the entry detection plane, and the second sensors, which are components of the muting sensor section, are disposed on the passing direction-second side of the entry detection plane. That is, the detection ranges of the first sensors and the detection ranges of the second sensors do not intersect, and are each set to be parallel to the entry detection plane. Accordingly, the positional relationship in the passing direction between each of the detection positions of the muting sensor section and the detection position of the entry detection sensor can be easily set appropriately even in a relatively small installation space. In addition, the two first detection ranges are set to be spaced apart from each other in the width direction, the two second detection ranges are set to be spaced apart from each other in the width direction, and the entry detection sensor will not be disabled unless both of the two first sensors detect the object or both of the two second sensors detect the object. Thus, it is possible to enable the entry detection sensor for an object that is not included in both of the two first detection ranges, and an object that is not included in both of the two second detection ranges. Therefore, entry of an object that is not allowed to enter can be appropriately detected by the entry detection sensor. In this manner, with the present configuration, it is possible to provide a technique by which, in an entry detection system for detecting an object entering a predefined region, it is possible to appropriately disable detection of an object that is allowed to enter the region.

Further features and advantages of the entry detection system will become apparent from the following description of illustrative and non-limiting embodiments with reference to the drawings.

DESCRIPTION OF THE INVENTION

Figure 1:
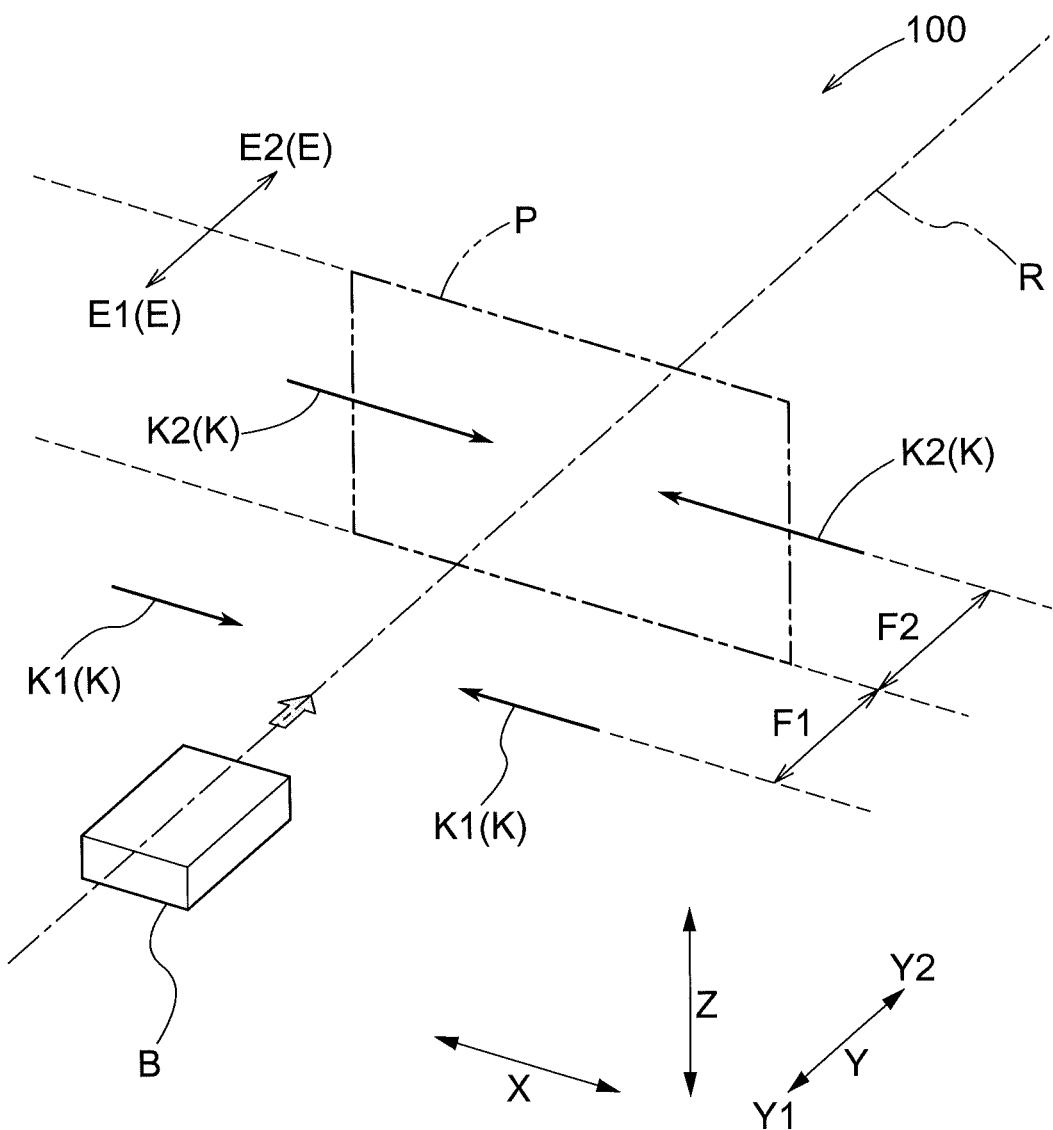
FIG. 1 is a diagram showing an example of an article transport facility including an entry detection system.
Figure 2:
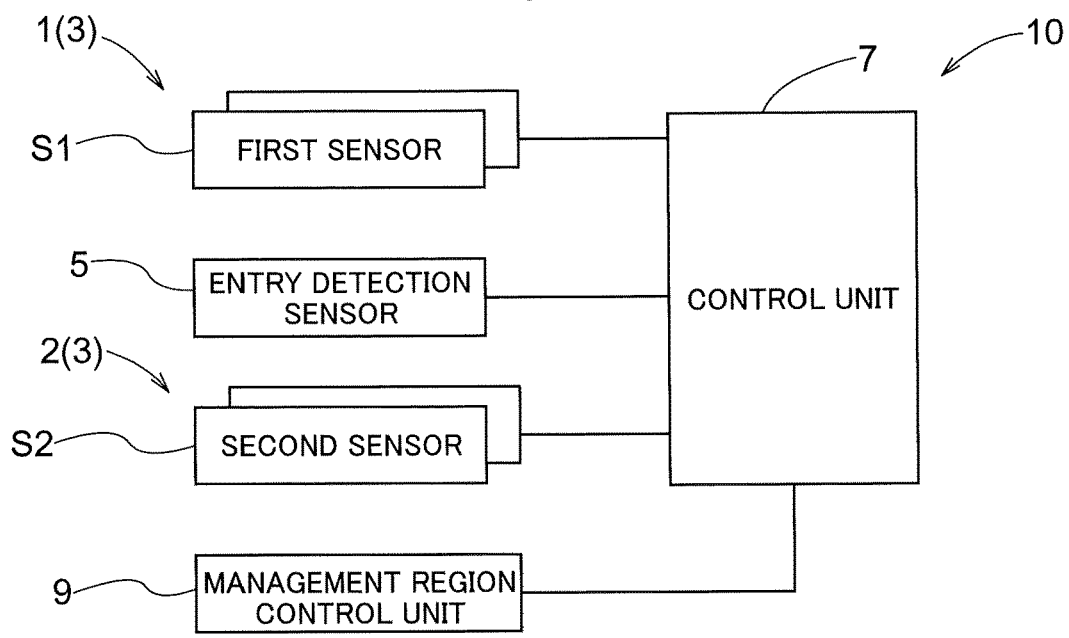
FIG. 2 is a block diagram showing an exemplary configuration of the entry detection system.
Figure 3:
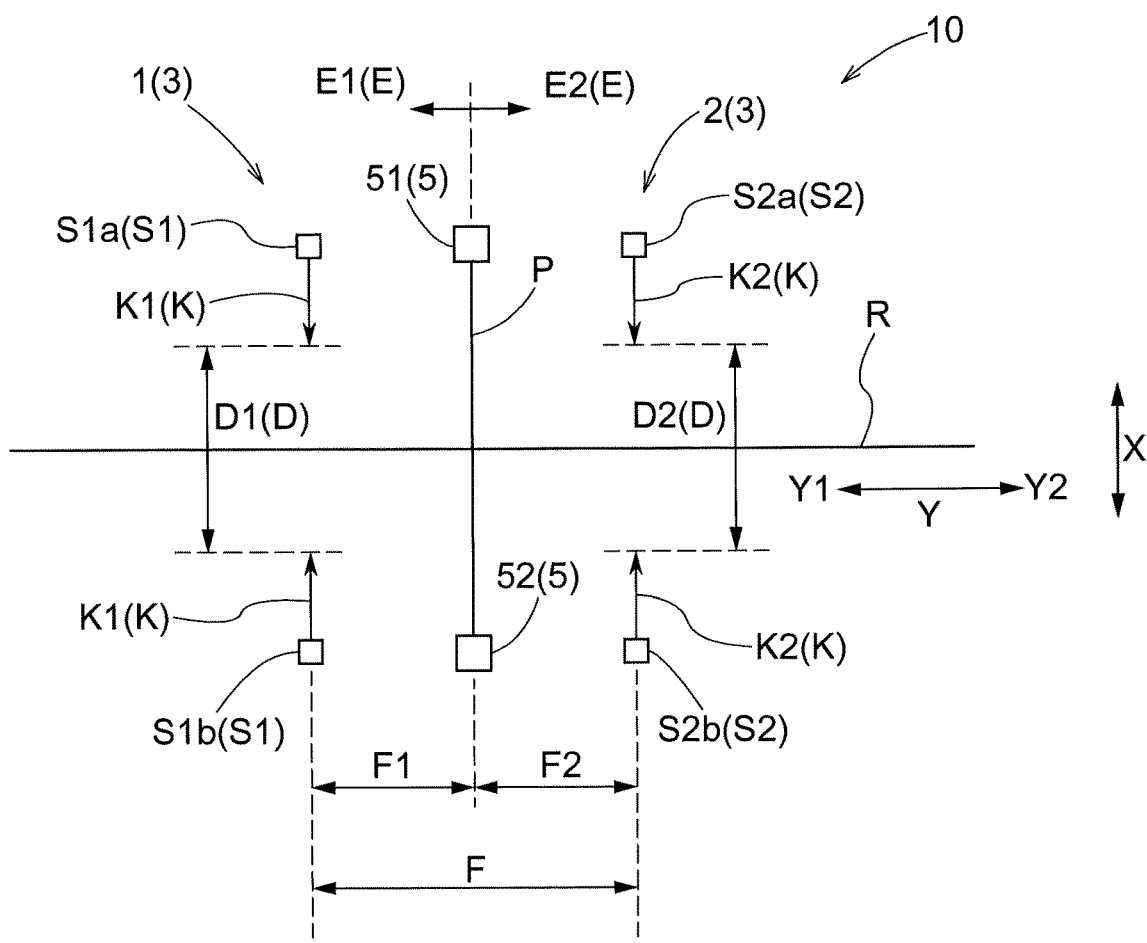
FIG. 3 is an explanatory diagram showing exemplary detection ranges of the entry detection system.

An embodiment of the entry detection system will be described with reference to the drawings. The entry detection system is provided in a facility (e.g., an article transport facility or a manufacturing facility) including a specific management region in which entry of a person such as a worker is restricted, and a general region that is less restricted than the management region. FIG. 1 schematically shows an example of such a facility (a transport facility 100 in this example). The block diagram of FIG. 2 shows an exemplary configuration of an entry detection system provided in the transport facility 100. FIG. 3 shows exemplary detection ranges of the entry detection system.

In the transport facility 100, an article is transported along a preset path R. The path R may be a tracked path formed by rails or the like, or may be a trackless path that does not include any rail and is set based on coordinates on a floor surface, for example. The article is transported by an article transport vehicle (an example of an object B). For example, in the case where the path R is a trackless path, an AGV (Automatic Guided Vehicle) is used as the article transport vehicle.

The transport facility 100 is provided with at least a general region E1 and a management region E2. For example, a warehouse that stores articles, a manufacturing facility in which manufacture is performed using articles, and so forth are installed in the management region E2. For example, the warehouse is provided with an automatic transfer machine or the like for transferring articles between the warehouse and the article transport vehicle, and the manufacturing facility is provided with an automatic machine tool. For this reason, entry of a person, including, a worker, into the management region E2 is, in general, restricted. If a person accidentally enters the management region E2, it is preferable to stop operation of the automatic transfer machine, the automatic machine tool, and the like for safety consideration. Accordingly, the transport facility 100 is provided with an entry detection system 10 for detecting an object B entering the management region E2, which is a predefined region. The management region control unit 9 shown in FIG. 2 can stop operation of the automatic transfer machine, the automatic machine tool, and the like in the management region E2, based on a detection result of the entry detection system 10 (in particular, an entry detection sensor 5 described later).

As shown in FIG. 2, the entry detection system 10 includes an entry detection sensor 5 that detects the object B, a muting sensor section 3 that detects the object B for disabling detection of the object B by the entry detection sensor 5, and a control unit 7 that controls operation of the entry detection sensor 5 based on a detection result of the muting sensor section 3. As shown in FIG. 1, the entry detection sensor 5 detects whether or not a part of the object B is present in an entry detection plane P having a predetermined area. In the present embodiment, the entry detection plane P is set to be orthogonal to the path R. Here, a passing direction Y is a direction orthogonal to the entry detection plane P, a passing direction-first side Y1 is one side in the passing direction Y, and a passing direction-second side Y2 is the other side in the passing direction Y. In addition, a width direction X is one of directions that are orthogonal to the passing direction Y and parallel to the entry detection plane P. In the present embodiment, the width direction X is a direction extending along a horizontal plane, among the directions that are orthogonal to the passing direction Y.

In the present embodiment, the entry detection sensor 5 is an optical sensor called a light curtain. The entry detection sensor 5 is formed by a light projector 51 (see FIG. 3, etc.) including a plurality of light projecting elements that are arranged in a row, and a light receiver 52 (see FIG. 3) including the same number of light receiving elements as the light projecting elements that are arranged in a row, the light projector 51 and the light receiver 52 being opposed to each other in the width direction X. Light emitted from the light projector 51 to the light receiver 52 forms the entry detection plane P. In response to the object B blocking the light emitted from the light projector 51 to the light receiver 52, the entry detection sensor 5 detects that a part of the object B is present in the entry detection plane P.

As shown in FIGS. 2 and 3, the muting sensor section 3 includes a first unit 1 and a second unit 2. The first unit 1 includes a pair of first sensors S1 (S1$a$, S1$b$) disposed on the passing direction-first side Y1 of the entry detection plane P in such a manner as to be spaced apart and opposed in the width direction X. The second unit 2 includes a pair of second sensors S2 (S2$a$, S2$b$) disposed on the passing direction-second side Y2 of the entry detection plane P in such a manner as to be spaced apart and opposed in the width direction X. As shown in FIGS. 1 and 3, each of the two first sensors S1 (S1$a$, S1$b$) detects whether or not the object B is present in a predefined first detection range K1. Similarly, each of the two second sensors S2 (S2a, S2b) detects whether or not the object B is present in a predefined second detection range K2.

As shown in FIGS. 1 and 3, each of the first detection ranges K1 extends from the corresponding one of the two first sensors S1 (S1a, S1b) in a direction toward each other in the width direction X. The first detection ranges K1 are set such that a pair of the first detection ranges K1 are spaced apart from each other in the width direction X. Similarly, each of the second detection ranges K2 extends from the corresponding one of the two second sensors S2 (S2a, S2b) toward each other in the width direction X. The second detection ranges K2 are set such that a pair of the second detection ranges K2 are spaced apart from each other in the width direction X.

The muting sensor section 3 is formed by a sensor that detects the presence or absence of an object in a set distance. The first unit 1 detects, from each of the first sensors S1 (S1a, S1b), whether or not the object B is present in the first detection range K1 in directions that are opposed in the width direction X. Alternatively, the first unit 1 may be formed by a range sensor that detects the distance from each of the first sensors S1 (S1a, S1b) to the object B when the object B is present in the first detection range K1. The same also applies to the second unit 2. In the present embodiment, an ultrasonic sensor is used as such a muting sensor section 3. As described above, the entry detection sensor 5 is an optical sensor. By varying the detection principle of the entry detection sensor 5 and the detection principle of the muting sensor section 3 from each other, the interference or the like between the two sensors is eliminated, thus suppressing a reduction in detection accuracy and an erroneous detection.

Figure 6:
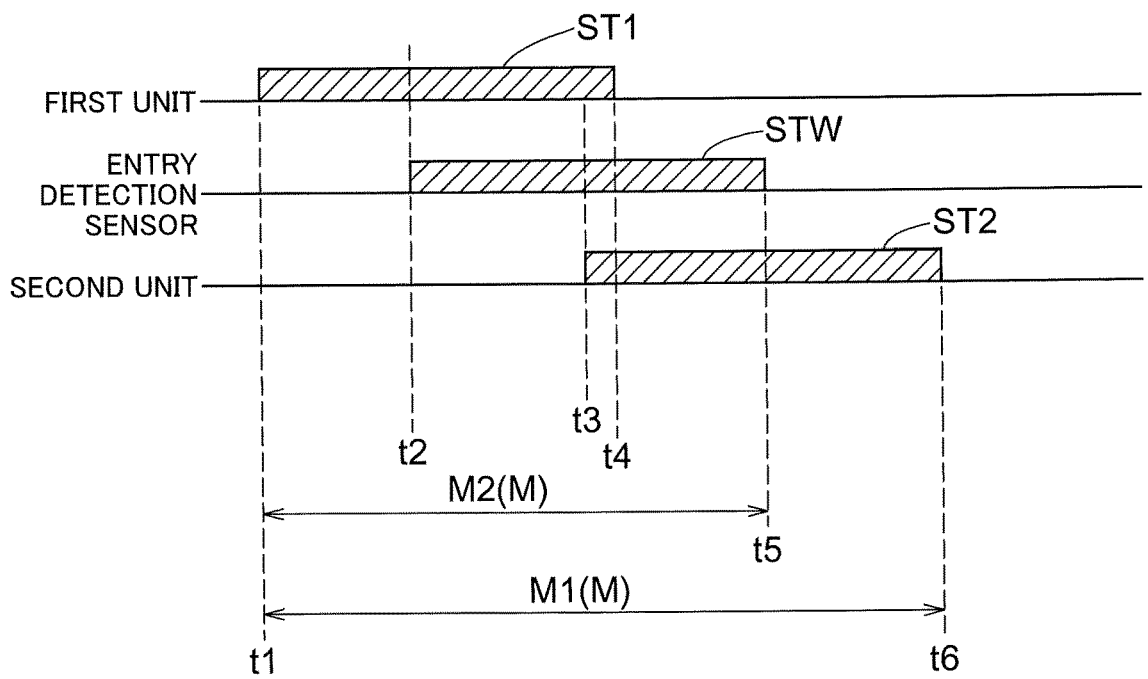
FIG. 6 is a time chart showing an example of the entry detection system.

Here, as shown in FIG. 6, a state in which both of the two first sensors S1 (S1a, S1b) detect the object B, or in other words, a state in which the first unit 1 detects the object B is referred to as first detection state ST1. A state in which both of the two second sensors S2 (S2a, S2b) detect the object B, or in other words, a state in which the second unit 2 detects the object B is referred to as a second detection state ST2. A state in which the entry detection sensor 5 detects the object B is referred to as an entry detection state STW.

The control unit 7 disables the entry detection sensor 5 in response to at least one of the first detection state ST1 and the second detection state ST2 being established. Here, "disabling" may include controlling the entry detection sensor 5 such that the entry detection sensor 5 does not detect the object B, for example, such that the entry detection state STW is not established, or may include causing the entry detection sensor 5 to detect the object B, and, even if the entry detection state STW has been established, causing the control unit 7 and the management region control unit 9 (see FIG. 3) to ignore the detection state.

For example, as shown in FIG. 6, at time t1, the first detection state ST1 is established in response to the first unit 1 detecting the object B, and the control unit 7 disables the entry detection sensor 5. Thereafter, at time t2, the entry detection state STW is established in response to the entry detection sensor 5 detecting the object B; however, the entry detection sensor 5 is disabled because the first detection state ST1 has been established. At the subsequent time t3, the second unit 2 also detects the object B, and the second detection state ST2 is established. At time t4, the object B moves past the first sensors S1, and the first detection state ST1 is cleared; however, the disabling of the entry detection sensor 5 is continued because the second detection state ST2 has been established.

At time t5, the object B moves past the entry detection plane P, and the entry detection state STW is also cleared. At the subsequent time t6, the object B moves past also the second sensors S2, and the second detection state ST2 is cleared, whereupon the entry detection sensor 5 is enabled. In this case, the period from time t1 to time t6 during which at least one of the first detection state ST1 and the second detection state ST2 is established is a mute period M (a first mute period M1), during which the entry detection sensor 5 is disabled. Note that in order for the disabling to be continued without interruption while the object B moves past the entry detection plane P, it is preferable to provide a period during which the first detection state ST1 and the second detection state ST2 overlap, such as the period from time t3 to time t4.

After the entry detection sensor 5 no longer detects the object B, or in other words, after time t5, the object B will not be detected even if the entry detection sensor 5 is not disabled. If the period from time t5 to time t6 is long, the object B (e.g., a person) may be able to enter the management region E2, following a target object TB (see FIG. 4, etc.) that is allowed to enter the management region E2. In the present embodiment, a first passing-direction separation distance F1 (see FIG. 5) that is a separation distance between the position of the first detection range K1 in the passing direction Y and the entry detection plane P can be easily varied from a second passing-direction separation distance F2 (see FIG. 5) that is a separation distance between the position of the second detection range K2 in the passing direction Y and the entry detection plane P.

For example, it is preferable that the first passing-direction separation distance F1 is set to be a length that allows a sufficient time to be secured until the entry detection sensor 5 is disabled after the target object TB has been detected. Specifically, it is preferable that the position of the first detection range K1 in the passing direction Y is set based on the sum of the time required for detection by the first sensors S1 and the time required until disabling of the first sensors S1 after the detection, and the movement speed of an article transport vehicle serving as the target object TB. It is preferable that the second passing-direction separation distance F2 is set such that the entry detection sensor 5 is not detecting the target object TB at the earliest time at which the second sensors S2 stop detecting the target object TB, based on the sensitivities of the entry detection sensor 5 and the second sensors S2. Of course, this does not exclude a case where the first passing-direction separation distance F1 and the second passing-direction separation distance F2 are the same.

In order for the entry detection sensor 5 to be disabled in response to at least one of the first detection state ST1 and the second detection state ST2 being established, an inter-unit separation distance F that is a separation distance between the first unit 1 (the first sensors S1) and the second unit 2 (the second sensors S2) in the passing direction Y is set to be shorter than the length of the target object TB in the passing direction Y.

Thus, in the present embodiment, the components of the muting sensor section 3 are installed on both the passing direction-first side Y1 and the passing direction-second side Y2 of the entry detection plane P. Accordingly, an object B approaching the entry detection plane P can be detected by the component (the first unit 1) of the muting sensor section 3 that is located on one side, before the object B reaches the entry detection plane P. In a state in which at least a part of the object B is still present in the entry detection plane P after the whole of the object B has passed through the detection range of the first unit 1, the object B is detected by the component (the second unit 2) of the muting sensor section 3 that is located on the other side. Accordingly, when the object B is a target object TB that is allowed to pass through the entry detection plane P, the entry detection sensor 5 can be appropriately disabled, thus allowing the target object TB to pass through the entry detection plane P.

The first unit 1 and the second unit 2 are placed such that the respective detection ranges thereof are parallel to the entry detection plane P. Accordingly, as described above, the positional relationship between the detection position of the muting sensor section 3 and the detection position of the entry detection sensor 5 in the passing direction Y can be easily set appropriately. This makes it possible to secure a sufficient time until the entry detection sensor 5 is disabled after the target object TB that is allowed to enter has been detected by the muting sensor section, and also appropriately set the time until completion of disabling of the entry detection sensor 5.

Note that the detection by the muting sensor section 3 needs to be performed so as to allow passage of the target object TB, which is the object B that is allowed to pass through the entry detection plane P, while not detecting an object B such as a person that is restricted from passing through the entry detection plane P. Therefore, a first separation distance D1 (see FIG. 3) that is a separation distance (a width-direction separation distance D) between the two first detection ranges K1 in the width direction X, and a second separation distance D2 (see FIG. 3) that is a separation distance (a width-direction separation distance D) between the two second detection ranges K2 in the width direction X need to be set appropriately. Since the target objects TB of the first unit 1 and the second unit 2 are the same, the first separation distance D1 and the second separation distance D2 may have the same value. For example, it is preferable that the first separation distance D1 and the second separation distance D2 are set based on a target object width H that is a dimension, in the width direction X, of the target object TB that is allowed to pass through the entry detection plane P. Note that the target object width H is not limited to the width of the article transport vehicle. When an article to be transported has a width larger than the width of the article transport vehicle, and is transported while the article is protruding from the article transport vehicle in the width direction X, the width of the article to be transported may be the target object width H.

Figure 4:
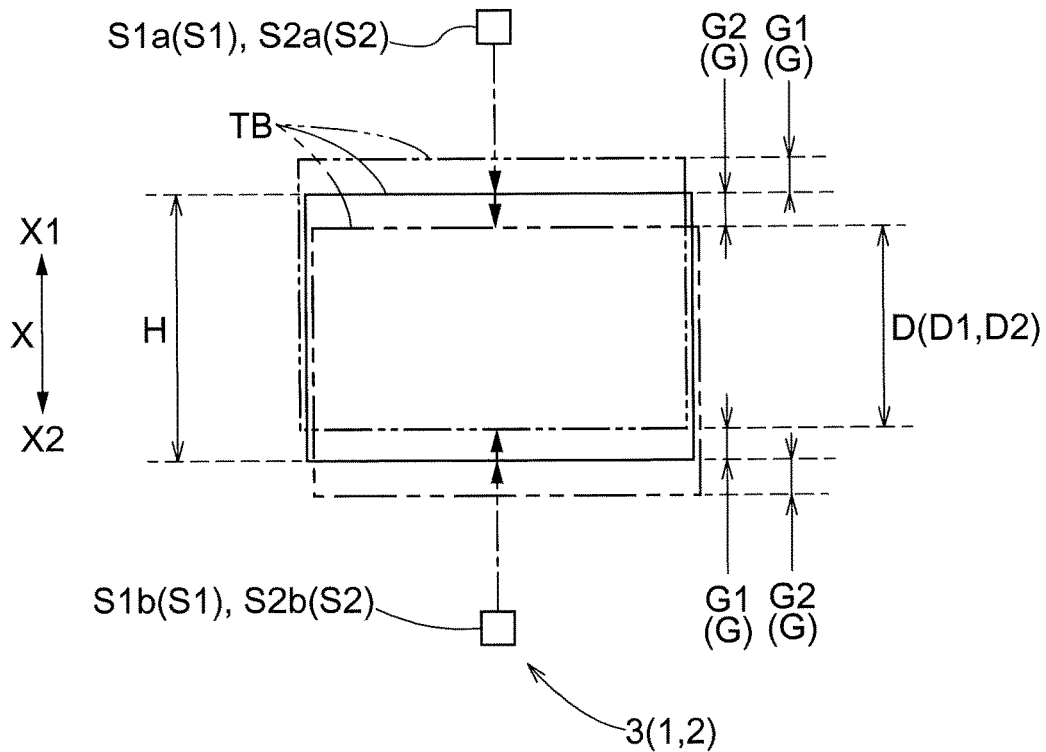
FIG. 4 is a diagram showing exemplary detection ranges of a muting sensor section in a width direction.

Meanwhile, there may be an error when the article transport vehicle or the like travels along the path R. In particular, positional shift may occur in the width direction X. Therefore, as shown in FIG. 4, it is preferable that the first separation distance D1 and the second separation distance D2 are set based on an allowable shift width G that is a range in which positional shift is allowed in the width direction X when the target object TB moves in the passing direction Y.

For example, when the target object TB is shifted by a first allowable shift width G1 toward a width direction-first side X1 that is one side in the width direction X, the detection range of the sensor S1b (also "S2b" of the second sensors S2) of the two first sensors S1 (also the second sensors S2) that is located on the one side needs to be extended toward the width direction-first side X1 by "G1". Similarly, when the target object TB is shifted by a second allowable shift width G2 toward a width direction-second side X2 that is the other side in the width direction X, the detection range of the sensor S1a (also "S2a" of the second sensors S2) of the two first sensors S1 (also the second sensors S2) that is located on the other side needs to be extended toward the width direction-second side X2 by "G2". That is, the detection ranges K are extended by the allowable shift width G, which is the sum of the first allowable shift width G1 and the second allowable shift width G2, toward a direction in which the first sensors S1 (also the second sensors S2) are opposed. Accordingly, it is preferable that the first separation distance D1 and the second separation distance D2 are set based also on the allowable shift width G.

That is, the width-direction separation distances D (the first separation distance D1 and the second separation distance D2) are set based on the target object width H and the allowable shift width G. Specifically, as shown in FIG. 4, the width-direction separation distances D (the first separation distance D1 and the second separation distance D2) are set to a dimension corresponding to a value obtained by subtracting the allowable shift width G from the target object width H. Note that the target object width H also has an error. Therefore, the target object width H in this case is preferably a minimum value within an acceptable error range. Alternatively, assuming "α" is a maximum tolerance on the negative side with respect to the standard value of the target object width H, it is preferable that the width-direction separation distances D are set to a dimension obtained by subtracting the allowable shift width G and the maximum negative tolerance "α" from the target object width H.

Figure 5:
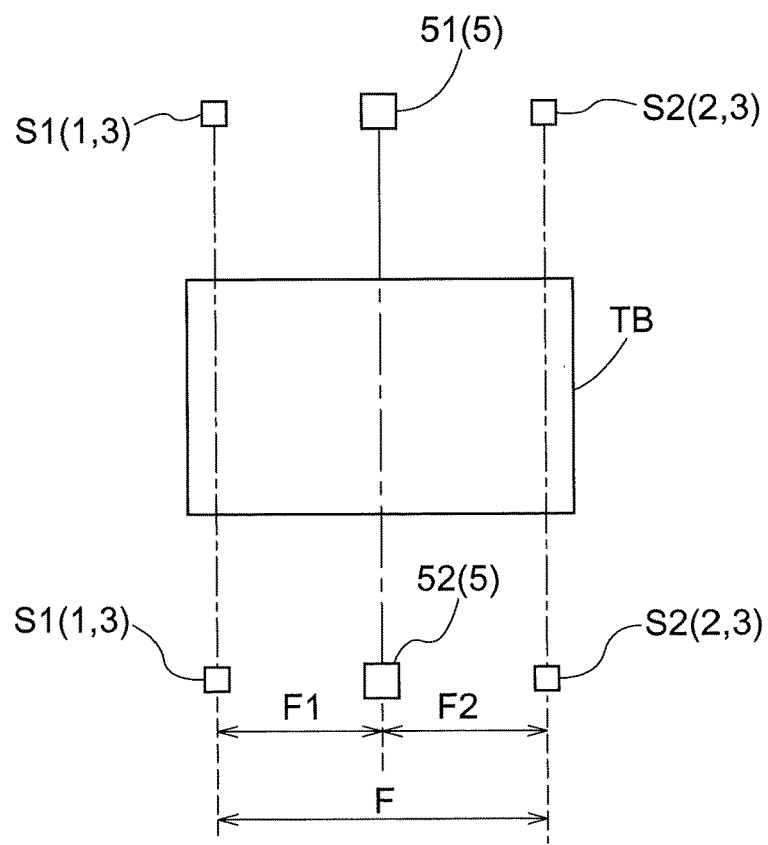
FIG. 5 is a diagram showing an exemplary placement position of the entry detection system in a passing direction.

Meanwhile, as shown in FIG. 5, the inter-unit separation distance F that is the separation distance between the first unit 1 (the first sensors S1) and the second unit 2 (the second sensors S2) in the passing direction Y is set to be shorter than the length of the target object TB in the passing direction Y, as shown in FIG. 5. As described above, this is to provide a state in which at least one of the first detection state ST1 and the second detection state ST2 is established while the target object TB passes through the entry detection plane P, thus allowing the entry detection sensor 5 to be disabled. On the other hand, it is preferable that the object B for which entry is to be restricted does not satisfy such a condition. In many cases, it seems that there is almost no possibility that the object B, such as a person, for which restriction should be made is simultaneously detected in the detection ranges K of the two first sensors S1, or simultaneously detected in the detection ranges K of the two second sensors S2. However, it is further preferable that the object B will not be simultaneously detected by the first unit 1 and the second unit 2. For example, the inter-unit separation distance F that is the separation distance between the first unit 1 and the second unit 2 in the passing direction Y is set to be larger than the thickness of a human body in the front-rear direction. Accordingly, when a person passes through the entry detection plane P, there is a period during which the person is detected by neither the first unit 1 nor the second unit 2, and it is therefore possible to increase the possibility of detecting entry of the person by the entry detection sensor 5.

Figure 7:
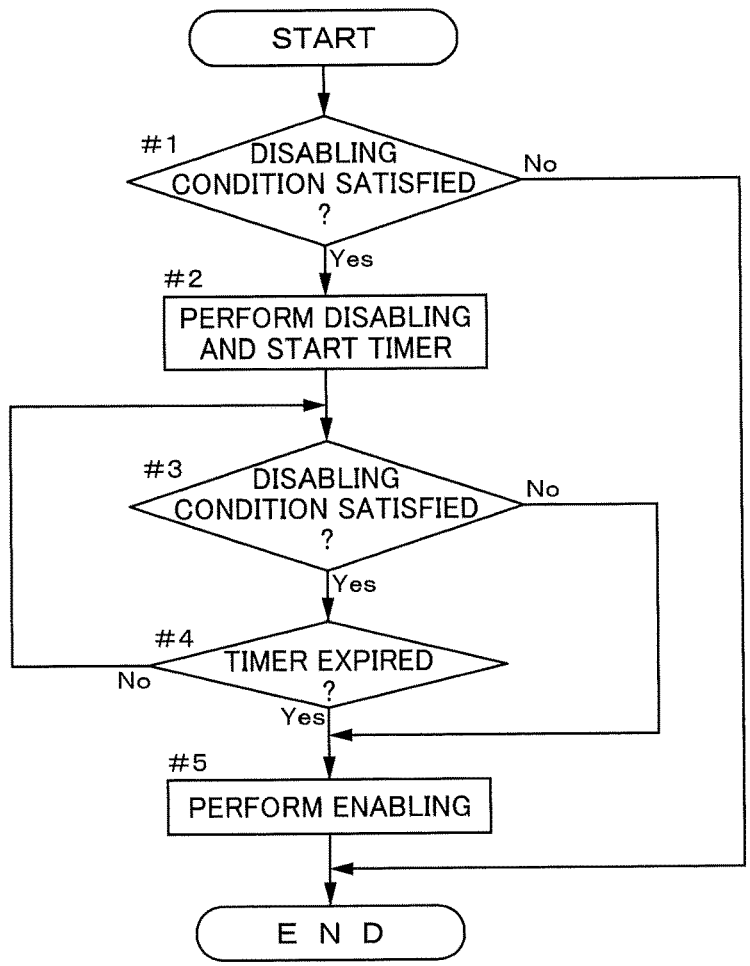
FIG. 7 is a flowchart showing an example of the entry detection system.

In the following, a description will be given with reference to the flowchart of FIG. 7 as well. The control unit 7 first determines whether or not a disabling condition is satisfied (#1). Here, as previously described with reference to FIG. 6 and so forth, whether or not the first detection state ST1 in which both of the two first sensors S1 (S1a, S1b) detect the object B is established. If it is determined that the first detection state ST1 is established, the control unit 7 disables the entry detection sensor 5, and starts a timer (#2). As described above, this disabling may include suspending the function of the entry detection sensor 5, or may include causing the control unit 7 to ignore a detection result of the entry detection sensor 5. In the case where a detection result of the entry detection sensor 5 is directly transmitted to the management region control unit 9, information indicating disabling may be transmitted to the management region control unit 9 from the control unit 7 such that the detection result is ignored by the management region control unit 9.

Note that the timer is set in order to enable the entry detection sensor 5 again after a timeout for safety consideration, if disabling has continued for a predetermined time or more. For example, in a case where the article transport vehicle has stopped due to a failure or the like at a position at which the article transport vehicle is detected by the muting sensor section 3, a state in which detection in the entry detection plane P is disabled continues. At this time, if the article transport vehicle has stopped at a position at which the article transport vehicle is detected by the entry detection sensor 5, entry into the management region E2 is also prevented by the article transport vehicle. Therefore, it is difficult for a person to enter the management region E2 from the general region E1. However, if the article transport vehicle has stopped in front of the position at which the article transport vehicle is detected by the entry detection sensor 5, the entrance is in the open state. Accordingly, a person may be able to relatively easily enter the management region E2 from the general region E1. In such a case, it is preferable that the entry detection sensor 5 is enabled because it is highly likely that the automatic transfer machine and the automatic machine tool are being operated in the management region E2.

After disabling the entry detection sensor 5, the control unit 7 again determines whether or not the disabling condition is satisfied (#3). That is, the control unit 7 determines whether or not at least one of the first detection state ST1 in which both of the two first sensors S1 (S1a, S1b) detect the object B, and the second detection state ST2 in which both of the two second sensors S2 (S2a, S2b) detect the object B is established. If one of the first detection state ST1 and the second detection state ST2 is established and the timer has not expired (#4), the disabling continues (times t1 to t6 in FIG. 6). If both the first detection state ST1 and the second detection state ST2 are no longer established (after time t6 in FIG. 6), or if the timer has expired (#4), the disabling ends, and the entry detection sensor 5 is enabled again (#5).

As described thus far, according to the present embodiment, in the entry detection system 10 for detecting an object B entering a predefined region (the management region E2), it is possible to appropriately disable detection of an object B (target object TB) that is allowed to enter the region.

Other Embodiments

Other embodiments will be described below. Note that the configurations of the embodiments described below are not limited to being used alone, and may be used in combination with configurations disclosed in other embodiments as long as no inconsistency arises.

(1) The above embodiment has illustrated a configuration in which the entry detection sensor 5 is an optical sensor, and the muting sensor section 3 is an ultrasonic sensor. However, this does not exclude a configuration in which the entry detection sensor 5 is an ultrasonic sensor, and the muting sensor section 3 is an optical sensor. As long as the detection principles of the entry detection sensor 5 and the muting sensor section 3 are different from each other, sensors using detection principles other than an optical principle and an ultrasonic principle may be used.

(2) The above embodiment has illustrated a configuration in which the detection principles of the entry detection sensor 5 and the muting sensor section 3 are different from each other. However, this does not exclude a case where the detection principles of the entry detection sensor 5 and the muting sensor section 3 are the same. For example, the entry detection sensor 5 may be an optical light curtain, and the muting sensor section 3 may also be an optical range sensor.

(3) The above embodiment has illustrated a configuration in which the inter-unit separation distance F between the first unit 1 and the second unit 2 in the passing direction Y is larger than the thickness, in the front-rear direction, of a human body, which is an object for which entry should be restricted. However, it is unlikely that a person is simultaneously detected by both of the two first sensors, or simultaneously detected by both of the second sensors. Therefore, this does not exclude a case where, giving priority to efficiency or the like, the inter-unit separation distance F is set to be smaller than or equal to the thickness of a human body in the front-rear direction.

(4) The above embodiment has illustrated a configuration in which the path R is formed along a horizontal plane, and the entry detection plane P is set extending in a vertical direction Z (see FIG. 1). However, the article transport vehicle is not limited to a configuration in which it moves in the horizontal direction, and the article transport vehicle may move in the vertical direction. In that case, the entry detection plane P may be set extending along a horizontal plane. In that case, the width direction X may be any of the directions that are orthogonal to the passing direction Y.

(5) The above embodiment has illustrated a configuration in which, as in the case of the first mute period M1 shown in FIG. 6, the first mute period M1 during which the entry detection sensor 5 is disabled is set in response to at least one of the first detection state ST1 and the second detection state ST2 being established. However, after the entry detection sensor 5 no longer detects the object B, that is, after time t5, the object B is not detected even if the entry detection sensor 5 is not disabled. Accordingly, the mute period M may end at time t5 (a second mute period M2). In this case, the control unit 7 disables the entry detection sensor 5 in response to at least one of the first detection state and a state in which the entry detection state STW and the second detection state are established being established.

In this case, the system configuration is slightly complicated because whether or not muting is to be performed is determined based on detection results of both the muting sensor section 3 (the first unit 1, the second unit 2) and the entry detection sensor 5 whereas, in the first mute period M1, whether or not muting is to be performed is determined only by the muting sensor section 3. In addition, the second mute period M2 cannot be used if the disabling disables the detection function itself of the entry detection sensor 5. However, in the case of using the second mute period M2, the entry detection sensor 5 can be promptly enabled when muting is no longer needed.

Outline of the Embodiment

An outline of the entry detection system described above will be briefly described below.

As a preferred aspect, an entry detection system for detecting an object entering a predetermined region includes: an entry detection sensor configured to detect whether or not a part of the object is present in an entry detection plane having a predetermined area; a muting sensor section configured to detect the object in order to disable detection of the object by the entry detection sensor, the muting sensor section including a first unit and a second unit; and a control unit configured to control operation of the entry detection sensor, based on a detection result of the muting sensor section, wherein with a passing direction being a direction orthogonal to the entry detection plane, a passing direction-first side being one side in the passing direction, and a passing direction-second side being another side in the passing direction, the first unit includes a pair of first sensors disposed on the passing direction-first side of the entry detection plane in such a manner as to be spaced apart and opposed in a width direction extending parallel to the entry detection plane, each of the two first sensors detects whether or not the object is present within a predefined first detection range, the first detection range extends from each of the two first sensors toward each other in the width direction, and a pair of the first detection ranges are set in such a manner as to be spaced apart from each other in the width direction, the second unit includes a pair of second sensors disposed on the passing direction-second side of the entry detection plane in such a manner as to be spaced apart and opposed in the width direction, each of the two second sensors detects whether or not the object is present within a predefined second detection range, the second detection range extends from each of the second sensors toward each other in the width direction, and a pair of the second detection ranges are set in such a manner as to be spaced apart from each other in the width direction, and the control unit disables the entry detection sensor in response to at least one of a first detection state and a second detection state being established, the first detection state being a state in which both of the two first sensors detect the object, and the second detection state being a state in which both of the two second sensors detect the object.

With this configuration, the components of the muting sensor section capable of detecting an object are installed on both the passing direction-first side and the passing direction-second side of the entry detection plane. Accordingly, an object approaching the entry detection plane in the passing direction can be detected by the components of the muting sensor section that are located on one side out of the passing direction-first side and the passing direction-second side, before the object reaches the entry detection plane. If a part of the object is still present in the entry detection plane after the whole of the object has passed through the detection range of the components of the muting sensor section that are located on the one side, the object can be detected by the components of the muting sensor section that are located on the other side. Accordingly, if the detected object is an object that is allowed to pass through the entry detection plane, it is possible to promptly disable the entry detection sensor before the object reaches the entry detection plane, and appropriately continue the disabling while the object moves past the entry detection plane. With the present configuration, the first sensors, which are components of the muting sensor section, are disposed on the passing direction-first side of the entry detection plane, and the second sensors, which are components of the muting sensor section, are disposed on the passing direction-second side of the entry detection plane. That is, the detection ranges of the first sensors and the detection ranges of the second sensors do not intersect, and are each set to be parallel to the entry detection plane. Accordingly, the positional relationship in the passing direction between each of the detection positions of the muting sensor section and the detection position of the entry detection sensor can be easily set appropriately even in a relatively small installation space. In addition, the two first detection ranges are set to be spaced apart from each other in the width direction, the two second detection ranges are set to be spaced apart from each other in the width direction, and the entry detection sensor will not be disabled unless both of the two first sensors detect the object or both of the two second sensors detect the object. Thus, it is possible to enable the entry detection sensor for an object that is not included in both of the two first detection ranges, and an object that is not included in both of the two second detection ranges. Therefore, entry of an object that is not allowed to enter can be appropriately detected by the entry detection sensor. In this manner, with the present configuration, it is possible to provide a technique by which, in an entry detection system for detecting an object entering a predefined region, it is possible to appropriately disable detection of an object that is allowed to enter the region.

It is preferable that a first separation distance that is a separation distance between the pair of first detection ranges in the width direction, and a second separation distance that is a separation distance between the pair of second detection ranges in the width direction are set based on a target object width that is a dimension, in the width direction, of a target object that is allowed to pass through the entry detection plane, and an allowable shift width that is a range in which positional shift is allowed in the width direction when the target object moves in the passing direction.

With this configuration, it is possible to appropriately set the first separation distance and the second separation distance, taking into account the dimension of the target object in the width direction and the positional shift of the target object in the width direction while the target object is moving. Accordingly, the target object can be appropriately detected by the muting sensor section.

It is preferable that the first separation distance and the second separation distance are set to a dimension corresponding to a value obtained by subtracting the allowable shift width from the target object width.

With this configuration, even if the target object is positionally shifted in the width direction within the range of the allowable shift width, the target object is included in both of the two first detection ranges, and the target object is included in both of the two second detection ranges. Accordingly, the target object can be appropriately detected by the muting sensor section, regardless of the positional shift of the target object in the width direction.

It is preferable that the first unit and the second unit have a separation distance therebetween in the passing direction, the separation distance being larger than a thickness of a human body in a front-rear direction.

The subject for which passage through such an entry detection plane is restricted may be a person. In many cases, the length, in the passing direction, of an article that is allowed to pass through the entry detection plane is larger than the thickness of a human body in the front-rear direction. Accordingly, by disabling the entry detection sensor in response to one of the first unit and the second unit detecting an object, the operation of the entry detection sensor can be controlled such that an object that is allowed to pass through the entry detection plane can appropriately pass therethrough. Also, as a result of the first unit and the second unit being spaced apart from each other in the passing direction by a distance larger than the thickness of a human body in the front-rear direction, there will be a period during which a person is detected by neither the first unit nor the second unit when the person passes through the entry detection plane. Accordingly, it is possible to increase the possibility that the entry of a person can be detected by the entry detection sensor.

It is preferable that the entry detection sensor and the muting sensor section are sensors that detect the object using detection principles different from each other.

For example, in a case where the entry detection sensor and the muting sensor section are both optical sensors, for example, light that has been reflected (including diffuse reflection) by an object that is allowed to pass through the entry detection plane, including, for example, the surface of the article transport vehicle and a fastening member such as a screw, may reduce the detection accuracy of the muting sensor section, or cause an erroneous detection. For example, when the article transport vehicle is an automated guided vehicle, an optical obstacle sensor is often installed in order to prevent contact or collision with a worker or other objects. The detection accuracy may also be reduced as a result of light projected from such an obstacle sensor entering the muting sensor section. Similarly, also in a case where the entry detection sensor and the muting sensor section are both ultrasonic sensors, the detection accuracy may be reduced due to interference or the like, or an erroneous detection may occur. The reduction in accuracy and an erroneous detection as described above can be suppressed when the detection principle of the entry detection sensor and the detection principle of the muting sensor section are different from each other as in the case of the present configuration.

It is preferable that the entry detection sensor is an optical sensor, and the muting sensor section is an ultrasonic sensor.

For an optical sensor, a detection range in the shape of a plane with a small thickness can be easily set. On the other hand, for an ultrasonic sensor, the extent of the detection range tends to be larger than that of the optical sensor, and therefore the ultrasonic sensor can detect the presence or absence of an object within a range having a certain extent. For this reason, the ultrasonic sensor is less susceptible to influence by the shape of an object in the case of detecting the presence or absence of an object that is allowed to pass through the entry detection plane. Accordingly, an article that should be allowed to enter can be prevented from being erroneously detected by the entry detection sensor due to a delay in detection by the muting sensor section. Therefore, when the entry detection sensor is an optical sensor, and the muting sensor section is an ultrasonic sensor, it is possible to appropriately detect an object in the entry detection plane, while appropriately controlling the operation of the entry detection sensor.

DESCRIPTION OF REFERENCE SIGNS

1: First unit
2: Second unit
3: Muting sensor section
5: Entry detection sensor
7: Control unit
10: Entry detection system
B: Object
D: Width-direction separation distance (separation distance in width direction)
D1: First separation distance
D2: Second separation distance
E2: Management region (predefined region)
F: Inter-unit separation distance (separation distance in passing direction)
G: Allowable shift width
H: Target object width
K: Detection range
K1: First detection range
K2: Second detection range
P: Entry detection plane
S1: First sensor
S2: Second sensor
ST1: First detection state
ST2: Second detection state
TB: Target object
X: Width direction
Y Passing direction
Y1: Passing direction-first side
Y2: Passing direction-second side

The invention claimed is:

1. An entry detection system for detecting an object entering a predefined region, the system comprising:
   an entry detection sensor configured to detect whether or not a part of the object is present in an entry detection plane having a predetermined area;
   a muting sensor section configured to detect the object in order to disable the entry detection sensor from detecting the object, the muting sensor section comprising a first unit and a second unit; and
   a control unit configured to control operation of the entry detection sensor based on a detection result of the muting sensor section,
wherein:
   a passing direction is a direction orthogonal to the entry detection plane, a passing direction-first side is one side in the passing direction, and a passing direction-second side is another side in the passing direction,
   the first unit comprises a pair of first sensors disposed on the passing direction-first side of the entry detection plane in so as to be spaced apart and opposed in a width direction extending parallel to the entry detection plane,
   each of the two first sensors detects whether or not the object is present within a predefined first detection range,
   the first detection range extends from each of the two first sensors toward each other in the width direction, and a pair of the first detection ranges are set so as to be spaced apart from each other in the width direction,
   the second unit comprises a pair of second sensors disposed on the passing direction-second side of the entry detection plane so as to be spaced apart and opposed in the width direction,
   each of the two second sensors detects whether or not the object is present within a predefined second detection range, the second detection range extends from each of the second sensors toward each other in the width direction, and a pair of the second detection ranges are set so as to be spaced apart from each other in the width direction, and
   the control unit disables the entry detection sensor in response to at least one of a first detection state and a second detection state being established, the first detection state is a state in which both of the two first sensors detect the object, and the second detection state is a state in which both of the two second sensors detect the object.

2. The entry detection system according to claim 1, wherein a first separation distance, that is a separation distance between the pair of first detection ranges in the width direction, and a second separation distance, that is a separation distance between the pair of second detection ranges in the width direction, are set based on a target object width that is a dimension, in the width direction, of a target object that is allowed to pass through the entry detection plane, and an allowable shift width that is a range in which positional shift is allowed in the width direction when the target object moves in the passing direction.

3. The entry detection system according to claim 2, wherein the first separation distance and the second separation distance are set to a dimension corresponding to a value obtained by subtracting the allowable shift width from the target object width.

4. The entry detection system according to claim 1, wherein the first unit and the second unit have a separation distance therebetween in the passing direction, and the separation distance is larger than a thickness of a human body in a front-rear direction.

5. The entry detection system according to claim 1, wherein the entry detection sensor and the muting sensor section are sensors that detect the object using detection principles different from each other.

6. The entry detection system according to claim 5, wherein the entry detection sensor is an optical sensor, and wherein the muting sensor section is an ultrasonic sensor.

7. The entry detection system according to claim 2, wherein the first unit and the second unit have a separation distance therebetween in the passing direction, and the separation distance is larger than a thickness of a human body in a front-rear direction.

8. The entry detection system according to claim 3, wherein the first unit and the second unit have a separation distance therebetween in the passing direction, and the separation distance is larger than a thickness of a human body in a front-rear direction.

9. The entry detection system according to claim 2, wherein the entry detection sensor and the muting sensor section are sensors that detect the object using detection principles different from each other.

10. The entry detection system according to claim 3, wherein the entry detection sensor and the muting sensor section are sensors that detect the object using detection principles different from each other.

11. The entry detection system according to claim 4, wherein the entry detection sensor and the muting sensor section are sensors that detect the object using detection principles different from each other.

* * * * *